Sept. 13, 1938.  C. E. BRADSHAW  2,129,989
FIFTH WHEEL CONSTRUCTION FOR TRAILERS
Filed Oct. 22, 1936   2 Sheets-Sheet 1
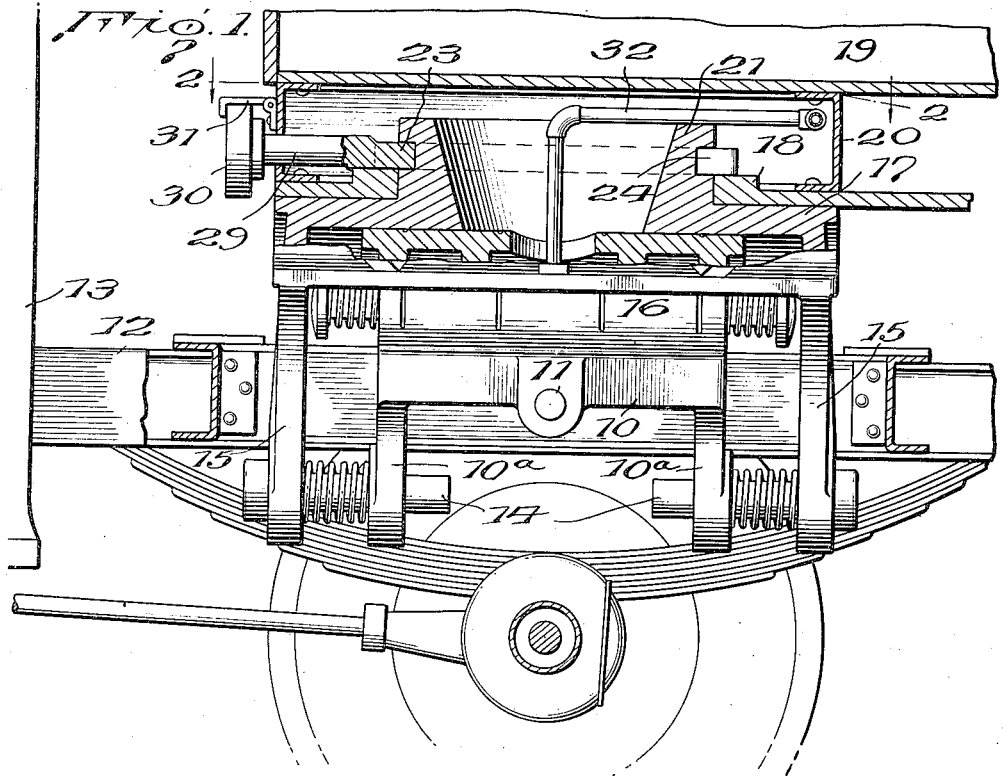
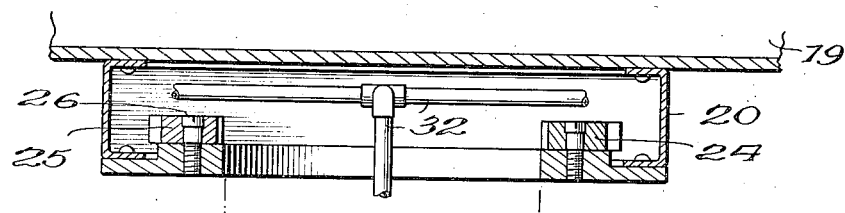
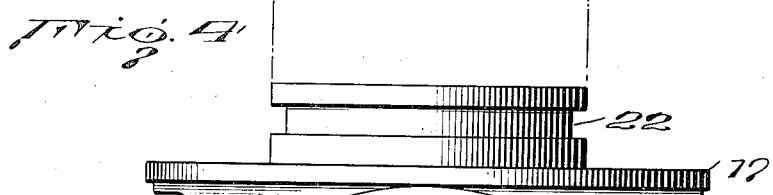
Inventor
Charles E. Bradshaw,
By Church & Church
His Attorneys Sept. 13, 1938.   C. E. BRADSHAW   2,129,989
FIFTH WHEEL CONSTRUCTION FOR TRAILERS
Filed Oct. 22, 1936   2 Sheets-Sheet 2
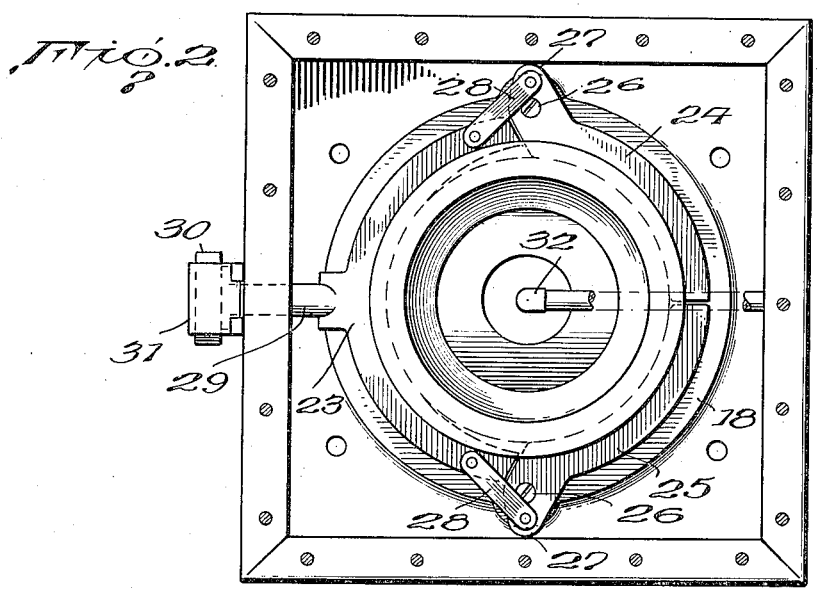
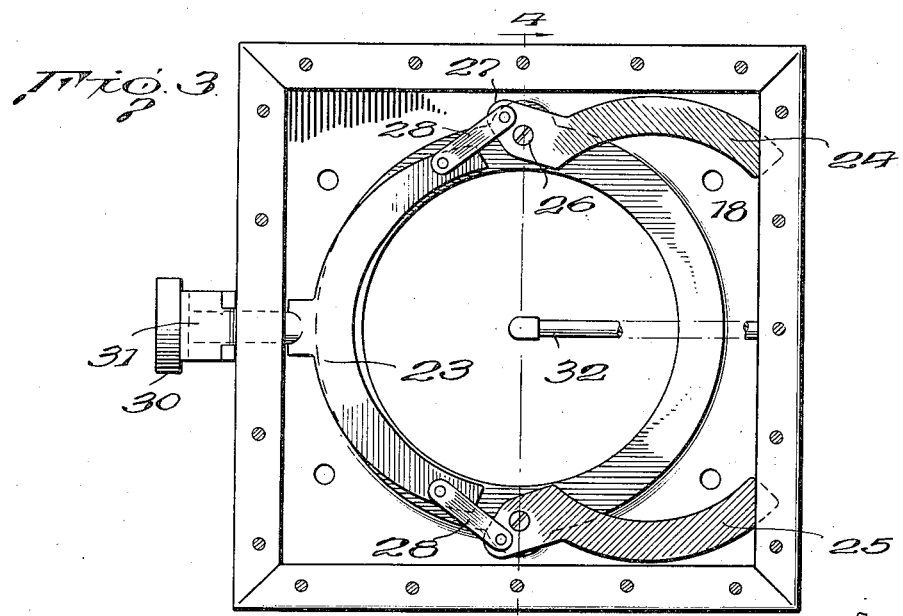
Inventor
Charles E. Bradshaw,
By Church & Church
His Attorneys Patented Sept. 13, 1938

2,129,989

UNITED STATES PATENT OFFICE 2,129,989

FIFTH WHEEL CONSTRUCTION FOR TRAILERS

Charles E. Bradshaw, Wellville, Va., assignor of one-third to Charles Martin, Wellville, Va.

Application October 22, 1936, Serial No. 107,067

3 Claims. (Cl. 280—33.1)

This invention relates to improvements in fifth wheel connections for attaching trailer vehicles to tractors or other draft vehicles.

The primary object of the invention is to provide a fifth wheel connection of this type, so constructed as to eliminate the use of a king pin or bolt, all draft and buffing strains being distributed over a comparatively large area. The elimination of the king pin or bolt also permits the provision of an opening vertically of the central portion of the connection whereby certain fixed portions of the trailer mechanism, which might otherwise interfere with the connection or limit the overall dimensions thereof, may be positioned in said opening.

A still further object of the invention is to provide a fifth wheel connection which will permit the trailer and the draft vehicle to be easily and readily detached from each other.

More specifically, the invention contemplates a universal fifth wheel connection comprising a turntable pivoted on the tractor and locking elements on the trailer removably interlocking with an exterior recessed portion of the turntable, the central portion of the turntable being open so that portions of the trailer mechanism, for instance, the pipe line for the trailer brakes, can extend vertically through the connection.

With these and other objects in view, the invention consists in certain details of construction and combinations and arrangements of parts, all as will hereinafter be more fully described and the novel features thereof particularly pointed out in the appended claims.

In the accompanying drawings illustrating the preferred embodiment of the invention—

Figure 1 is a vertical sectional view longitudinally of the forward portion of the trailer, a portion of the connection being shown in elevation;

Fig. 2 is a horizontal view on the line 2—2 of Fig. 1, with the locking elements of the trailer interlocked with the turntable;

Fig. 3 is a similar view, with the turntable removed, the locking elements being illustrated as disengaged; and Fig. 4 is a vertical section on the line 4—4 of Fig. 3.

The construction of the fifth wheel connection may, of course, take various forms, so far as concerns the arrangement for obtaining a universal movement between the connecting elements and to this extent the details of said construction form no part of the present invention. However, for the purpose of illustrating the present invention, the fifth wheel connection shown in applicant's prior Patent No. 2,053,812, dated September 8, 1936, is relied upon, and disclosed, to a certain extent, in the accompanying drawings. Suffice it to say that the present connection comprises a lower member 10, pivoted at 11 transversely of the chassis or frame 12 of the tractor 13. This pivotal mounting 11 permits relative rocking motion between member 10 and the tractor frame. Depending portions 10ª of member 10 carry shafts 14, on which a second member 15 is pivoted, this member being free to rock transversely of the tractor frame. Member 10 is formed with a convex surface 16, transversely of the vehicles, and member 15 is provided with a similar surface adapted to slidably engage surface 16. Member 15 is also provided with a turntable 17 on which the trailer is to be supported and, due to the ability of members 10 and 15 to rock, as above described, the upper surface of the turntable 17 is always maintained in a horizontal plane. Secured to the frame of the trailer is a plate 18 adapted to be supported and swiveled on the turntable. In the present instance, the trailer, a portion of which is shown at 19, is provided on the under surface of its body with channel irons 20, to which plate 18 is attached.

In order to eliminate the use of a king bolt or a king pin for securing the plate 18 on the turntable and, also, to provide clearance space for parts of the trailer construction, for instance, the pipe line for the brakes, the turntable is formed with a tubular extension 21, and the central portion of the turntable is entirely open. The vertical face or the periphery of this tubular extension 21 is recessed, there preferably being a continuous annular recess 22 in which, or with which, locking elements on plate 18 are adapted to engage to form an interlock between plate 18 and the turntable. Such locking means preferably comprises a split ring arrangement such as is best illustrated in Figs. 2 and 3. Said split ring, for instance, may be formed of a semi-circular segment 23 and two quarter segments 24, 25. Said quarter segments 24, 25, are pivoted on plate 18 at 26, and each of said segments is formed with a small extension 27 to which one end of a link 28 is pivoted, the opposite ends of the two links being likewise pivoted to the semi-circular segment. The semi-circular segment 23 is provided with a stem 29 which extends forwardly of the trailer and through the channel member 20, its protruding end being provided with a knob or handle 30. When the split ring is contracted, the several segments engage within the annular recess 22, so that the trailer is then interlocked with the tubular extension 21 of the turntable, but, as will be apparent, an outward or forward pull on stem 29 will, through the links 28, cause the quarter sections to swing on their pivotal centers 26 outwardly from the tubular extension 21. Thus, this outward pull will not only slide the semi-circular segment 23 out to a position to disengage it from the annular recess 22, but the swinging movement of the quarter segments 24, 25, will also clear the latter, whereupon the trailer may be lifted or elevated off of the turntable. In order to prevent accidental withdrawal of stem 29, a latch 31, pivoted on the trailer, is adapted to engage over the knob 30 so that the stem 29 cannot move outwardly, forwardly of the trailer, until the latch is lifted and disengaged from knob 30. The latch may be retained in its locking position by gravity.

With this construction, the use of a king bolt or pin is unnecessary. All draft and buffing strains are transmitted or distributed over a comparatively large area, i. e., the tubular extension 21, as distinguished from those types of fifth wheel connections where these strains are absorbed or imposed upon the ordinary king pin or king bolt. Furthermore, the absence of the king pin permits the tubular extension to be formed with a comparatively large bore and, likewise, the convex surface of members 10 can also be formed with an opening, so that the pipe 32 of the brake line can extend axially through the fifth wheel connection. This is quite advantageous because in a great many instances, the pipe line or other portions of the trailer mechanism impose limitations on the overall dimensions of the fifth wheel connection or, otherwise, the pipes or the like must be so located on the trailer with respect to the fifth wheel connection, that the swiveling motion of the trailer will not move the pipe or like elements into engagement with the connection. In other words, there must be ample clearance between the fifth wheel connection and all fixed portions of the trailer structure to prevent said portions being injured by being moved into contact with the fifth wheel connection when the trailer swings with respect to the tractor. It will also be appreciated that, in addition to the foregoing advantages, the present arrangement for securing a trailer on the turntable of the universal connection permits the trailer to be readily detached from the tractor. This, of course, is quite important where one tractor is used in conjunction with two or three trailers.

What I claim is:

1. In a universal fifth wheel connection for tractors and trailers, the combination of a turntable pivotally mounted on the tractor, a tubular extension formed concentrically with respect to the axial center of the turntable and having an annular recess in the exterior thereof, and a split locking ring on said trailer, one segment being slidable into and out of said annular recess and the remaining segments of said ring being pivotally attached to the trailer and movable into and out of locking engagement with said recess.

2. In a universal fifth wheel connection for tractors and trailers, the combination of a turntable pivotally mounted on the tractor, an extension of circular cross-section formed concentrically with respect to the axial center of the turntable and having a locking recess in the exterior surface thereof, and a split locking ring on said trailer, one segment of said ring being slidable into and out of said recess and the remaining segments being pivotally attached to the trailer, and connections between the first-mentioned segment and said remaining segments for swinging the latter on their pivotal centers into and out of locking engagement with said recess as said first-mentioned segment is slid into and out of said recess.

3. In a fifth wheel connection for tractors and trailers, the combination of a turntable pivotally mounted on the tractor and having an opening therein, a tubular extension on said turntable concentrically of said opening, a member on said trailer having an opening through which said tubular extension projects, said tubular extension constituting a king pin around which said member can rotate, the openings in said member, tubular extension and turntable being alined and constituting an unobstructed passage, and said tubular extension having a recess in its exterior surface, and means carried by said member exteriorly of said tubular extension engageable with said recess for detachably securing said member to said extension.

CHARLES E. BRADSHAW.